L. W. LOCKWOOD.
COMBINED RAIN AND GLARE GUARD FOR THE WINDSHIELDS OF AUTOMOBILES.
APPLICATION FILED JULY 16, 1917.
1,339,770.                                              Patented May 11, 1920.
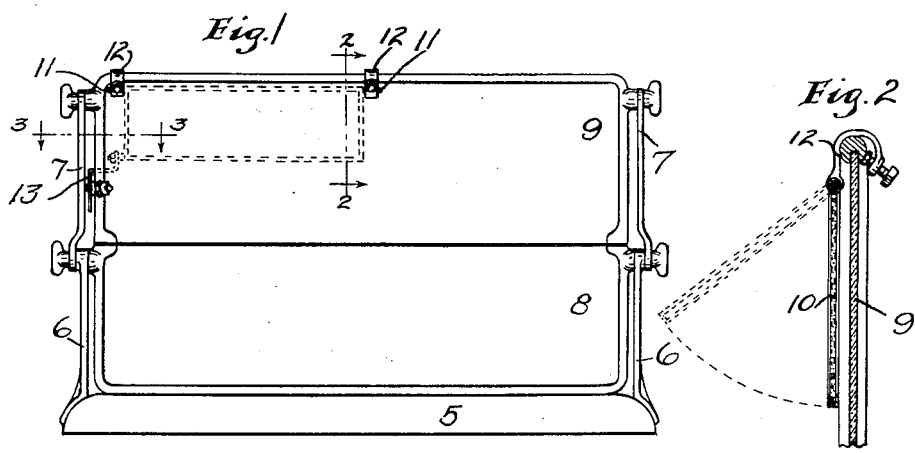
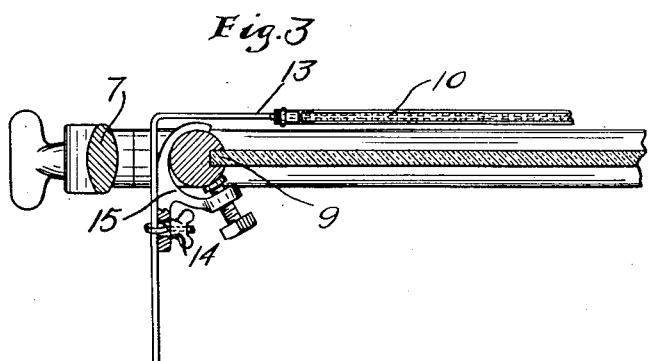
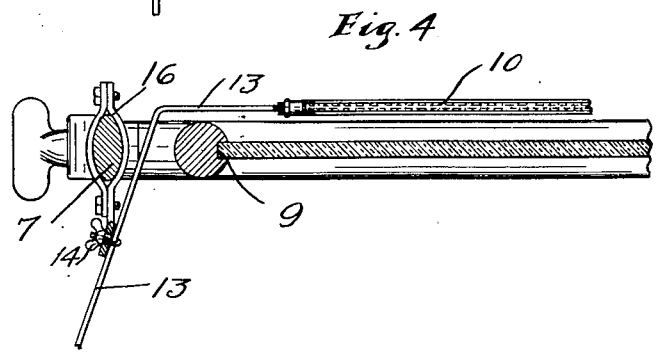
WITNESSES.
H. L. Opsahl.
G. F. Williamson
INVENTOR
Lee W. Lockwood.
BY HIS ATTORNEYS
Williamson & Merchant

UNITED STATES PATENT OFFICE.

LEE W. LOCKWOOD, OF MINNEAPOLIS, MINNESOTA.

COMBINED RAIN AND GLARE GUARD FOR THE WINDSHIELDS OF AUTOMOBILES.

1,339,770. Specification of Letters Patent. Patented May 11, 1920.

Application filed July 16, 1917. Serial No. 180,747.

*To all whom it may concern:*

Be it known that I, LEE W. LOCKWOOD, a citizen of the United States, residing at Minneapolis, in the county of Hennepin and State of Minnesota, have invented certain new and useful Improvements in Combined Rain and Glare Guards for the Windshields of Automobiles; and I do hereby declare the following to be a full, clear, and exact description of the invention, such as will enable others skilled in the art to which it appertains to make and use the same.

When the wind shield of an automobile is in position to protect the occupants of a forward moving machine from the wind, the driver must look through a transparent section of said shield to determine his steering course. If rain, snow or sleet be falling, the moisture will accumulate on the transparent panel of the wind shield and make it difficult, or even impossible, for the driver to see therethrough. The sections of the wind shield cannot be adjusted so as to permit the driver a proper vision of the road, by looking out between the open sections of the wind guard, without, at the same time, producing such an opening as to expose the occupants of the machine to the blast of the moisture-laden air.

It is also well known that most automobiles now employ strong headlights, the glare from which tends to blind the driver of a machine approaching and attempting to pass from the opposite direction. Because of this inadequate protection to the vision of the driver, serious accidents frequently occur.

The object of my invention is to afford an adequate guard to protect the driver from both sources of said troubles. In other words, my invention has for its object to provide a combined rain and glare-guarding attachment for the wind shield of an automobile; and, to this end, my invention consists of the novel devices and combinations of devices hereinafter described and defined in the claim.

My invention is illustrated in its preferred form, in the accompanying drawings, wherein like notations refer to like parts throughout the several views.

In said drawings,

Figure 1 is a view in elevation showing my attachment as applied in working position to the wind shield of an automobile, as the parts would appear looking from the position of the driver's seat;

Fig. 2 is a vertical cross section on the line 2—2 of Fig. 1;

Fig. 3 is a horizontal cross section on the line 3—3 of Fig. 1; and

Fig. 4 is a view similar to Fig. 3, but showing a modified form of the lever-anchoring clamp and the same applied to a different part of the wind shield.

Referring to said drawings, the numeral 5 represents a part of the front or dash board portion of an automobile body; the numerals 6 represent the lower or fixed portions of the wind shield frame and which have their lower ends fixed to the automobile body in any suitable way; the numerals 7 represent the upper portions of the wind shield frame and have their lower ends pivoted, in the usual way, to the fixed portions 6; and the numerals 8 and 9 represent, respectively, the lower and the upper adjustable panels of the wind shield, the lower panel 8 being pivoted to the fixed frame members 6 and the upper panel 9 to the pivoted frame sections 7—all in the usual way. Each of said shield sections 8 and 9 is composed of the customary transparent panel of glass, held in a suitable metallic rim, the rims being U-shaped and set with their open ends facing each other.

Wind shields, of the type illustrated and above briefly described, are in general usage, and although there are others which differ therefrom in some details, they all employ transparent glass panels, through which the driver must look when the sections of the shield are adjusted to keep out the wind, on the forward motion of the machine.

My attachment will now be described. The numeral 10 represents a plate of suitable material having a colored or light dimming surface and of the proper shape and size to span the vision space of the shield section 9, through which the driver must look when the wind shield is in its closed position. If glass is used for the material of this plate 10, I prefer to have the same amber color, as this is well known to be one of the best colors for intercepting the objectionable glare, which would otherwise be produced from the headlights of an approaching machine. A light green color, however, will give fairly good results.

The said plate 10 is provided with trunnions 11 (see Fig. 1), projecting from its upper corners and adapted to engage in the eyes of screw-action clamps 12, of the open or fork type, adapted to detachably and adjustably engage with the metallic rim of the upper wind shield panel 9, so as to hold the plate 10 suspended in front of the vision section of the wind shield panel 9, with freedom for pivotal or angular motion, in respect thereto, as best shown in Fig. 2.

To the outer end lower corner of the plate 10, is fixed the inner arm of an angular adjusting lever 13, the outer or free end of which is adapted to pass between the adjacent upper frame section 7 and the end of the adjacent wind shield panel 9, as best shown in Figs. 3 and 4, thereby bringing the inner end of the lever 13 into position to be reached by the driver. The numeral 14 represents a clamping swivel, carried by a suitable clamp 15 or 16, anchored to some relatively fixed part of the wind shield, as shown in Figs. 3 and 4, and which swivel engages the free end of the lever 13 and, by the tightening of which swivel clamp, the plate 10 may be held in any desired adjustment. The clamp 15, shown in Fig. 3, is of the screw-action fork type, and is shown as applied to the vertical or end rim section of the adjacent wind shield panel 9. The clamp 16 is of the two-section spanner type, and is shown as applied to the adjacent upper section 7 of the wind shield frame. The clamps 15 and 16 of these two different forms are so shown for adaptation to the two different anchoring positions on two different parts of the wind shield, as some persons may prefer one point of anchorage and others the other position. With the anchorage as shown in Fig. 3, the plate 10 will always be carried with the wind shield section 9 in its angular adjustment, whereas with the anchorage as shown in Fig. 4, the angular adjustment of the wind shield panel 9 and of the plate 10 may be independent of each other.

From the foregoing, it must be obvious that the plate 10 can be suspended in the positions shown in the drawings, or so as to span the vision section of the panel 9, through which the driver must look when the panel 9 is in its closed position, or as the parts are shown in full lines in Fig. 2; and it follows, that the driver will then look through also the plate 10 and that this plate, because of its amber color or glare-intercepting capacity, will guard the driver from the glare of an approaching light. It is equally obvious, that the wind shield section 9 can be independently adjusted, relative to the panel section 8, or the two sections in respect to each other, so as to afford a wind passage between the two, and yet the plate 10 be kept in proper relation to the face of the wind shield panel 9, to still be in the proper position to permit the driver to look therethrough and be protected thereby from the glare of the approaching light.

It is equally obvious, that if it is desired to guard off rain, sleet or snow, that the plate 10 can be angularly adjusted and set so as to stand in the dotted line position, shown in Fig. 2, or at any desired intermediate point. If it is set in its position, as shown in Fig. 2, it will completely guard the vision section of the panel 9 from the falling rain, snow or sleet, and permit the driver to get with his eyes a sufficient sweep of the road, by looking outward and downward below the inner face of the plate 10. While, at the same time, the said plate, standing in the position shown in dotted lines in Fig. 2, will intercept a large portion of the glaring rays of an approaching light, which would otherwise reach and tend to blind the driver. Moreover, the driver can vary the angular position of the plate 10 to meet the varying requirements of city and country roads, in respect to extent of vision on the roadway, and nevertheless keep the said plate 10 where it will serve both the rain-guarding and the glare-guarding function at the same time.

So far as I know, I am the first to provide any guard, capable of this double function at the same time.

In respect to the glare-guarding function, emphasis has so far been placed on the importance of guarding against the glare from the headlights of approaching or passing machines, but all drivers know that the glare from the sun is ofttimes hard on the eyes and glasses are much used by drivers to protect therefrom. My guard makes the usage of eyeglasses for that purpose unnecessary; for if left in the position, shown in full line in Fig. 2, the plate 10 will intercept enough of the rays of the light from the sun to protect the eyes of the driver. In other words, the plate 10 of my attachment serves useful functions, at all times, when the automobile is in use, whether that usage be in the sunlight or at night, under artificial lights, or in the daytime, when the sun is covered by clouds, and rain, sleet or snow is falling.

It is equally obvious, that the attachment is simple and cheap to make, and capable of quick and easy attachment to the wind shield.

What I claim is:—

A rain and glare-guarding attachment for the wind shield of an automobile, comprising mounting clamps detachably securable to the upper rim of the wind shield, a plate having a colored or light dimming surface pivoted to said mounting clamps, an adjusting lever attached to one end of said plate, a lever-anchoring clamp detachably and adjustably securable to the wind shield, and a clamping swivel carried by said anchoring clamp and engageable with said lever to hold said plate in any desired angular adjustment, substantially as described.

In testimony whereof I affix my signature in presence of two witnesses.

LEE W. LOCKWOOD.

Witnesses:
 CLARA DEMAREST,
 JAS. F. WILLIAMSON.